(12) United States Patent
Machida et al.

(10) Patent No.: US 7,136,215 B1
(45) Date of Patent: Nov. 14, 2006

(54) PIEZOELECTRICALLY-ACTIVATED CANTILEVERED SPATIAL LIGHT MODULATOR

(75) Inventors: Akihiro Machida, Sunnyvale, CA (US); Jun Amano, Hillsborough, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 14 days.

(21) Appl. No.: 11/131,706

(22) Filed: May 18, 2005

(51) Int. Cl.
*G02B 26/00* (2006.01)
*G02B 26/08* (2006.01)
*G01B 5/28* (2006.01)
*G01J 5/00* (2006.01)

(52) U.S. Cl. ............... 359/295; 359/290; 359/291; 359/221; 359/850; 73/105; 250/338.1; 250/306; 29/25.35; 361/278; 204/192.34

(58) Field of Classification Search ........ 359/290–293, 359/295, 221, 850, 213, 214; 73/105; 250/338.1, 250/306; 29/25.35, 830, 831; 361/277, 361/278, 292; 204/192.34, 192.27; 257/415, 257/419; 345/84, 97, 98, 100
See application file for complete search history.

(56) References Cited

U.S. PATENT DOCUMENTS

| | | | |
|---|---|---|---|
| 4,229,732 A | 10/1980 | Hartstein et al. | |
| 4,441,791 A | 4/1984 | Hornbeck | |
| 4,596,992 A | 6/1986 | Hornbeck | |
| 4,615,595 A | 10/1986 | Hornbeck | |
| 4,710,732 A | 12/1987 | Hornbeck | |
| 4,728,185 A | 3/1988 | Thomas | |
| 5,079,544 A | 1/1992 | DeMond et al. | |
| 5,245,863 A * | 9/1993 | Kajimura et al. | 73/105 |
| 5,260,926 A * | 11/1993 | Kuroda et al. | 369/100 |
| 5,394,741 A * | 3/1995 | Kajimura et al. | 73/105 |
| 5,442,414 A | 8/1995 | Janssen et al. | |
| 5,610,773 A * | 3/1997 | Min | 359/850 |
| 5,627,673 A * | 5/1997 | Min | 359/290 |
| 6,249,269 B1 | 6/2001 | Blalock et al. | |
| 6,329,974 B1 | 12/2001 | Walker et al. | |
| 6,377,438 B1 * | 4/2002 | Deane et al. | 361/278 |
| 6,379,510 B1 * | 4/2002 | Kane et al. | 204/192.34 |
| 6,420,706 B1 * | 7/2002 | Lurie et al. | 250/338.1 |
| 6,895,645 B1 * | 5/2005 | Xu et al. | 29/25.35 |
| 2005/0104478 A1 * | 5/2005 | Xu et al. | 310/331 |
| 2005/0224687 A1 * | 10/2005 | Heertjes et al. | 248/638 |

OTHER PUBLICATIONS

U.S. Appl. No. 10/792,777, filed Mar. 5, 2002, Amano.

* cited by examiner

*Primary Examiner*—Loha Ben (57) ABSTRACT

A piezoelectric spatial light modulator including a substrate having an array of cavities and piezoelectric cantilevers is arranged on the substrate. Each of the piezoelectric cantilevers includes a base portion on the substrate and a beam portion extending over a respective one of the cavities. Each of the piezoelectric cantilevers further includes a first electrode, a second electrode and a piezoelectric element between the electrodes. A flexible layer covers the cavities and the piezoelectric cantilevers and reflective elements are each located on the flexible layer over a respective one of the beam portions.

21 Claims, 9 Drawing Sheets

PIEZOELECTRICALLY-ACTIVATED CANTILEVERED SPATIAL LIGHT MODULATOR

BACKGROUND OF THE INVENTION

Current projector display systems use cathode ray tubes (CRTs) or spatial light modulators such as transmissive liquid crystal display (LCD) panels, liquid crystal on Silicon (LCoS) devices, or micro-electro-mechanical system (MEMS) mirror arrays. Single-panel multicolor displays that use CRTs, LCD or LCoS are not efficient due to the limited numerical aperture of the devices. Triple panel multicolor displays that use CRTs, LCD or LCoS are expensive.

MEMS-based projector display systems include display devices with a reflective segment for each pixel to redirect light incident on each reflective segment as needed for the projected image. MEMS-based displays have better contrast than the CRT, LCD, and LCoS based displays, however they are expensive because the fabrication process requires low-yield process steps in which a sacrificial layer is deposited and subsequently etched out below the reflective surface. One MEMS-based device is the Texas Instruments digital light processing chip, which uses electrostatic attraction to bend a deflectable reflecting flap to redirect incident light as described in U.S. Pat. No. 4,615,595 of Hornbeck entitled *Frame Addressed Spatial Light Modulator*, issued on Oct. 7, 1986.

A market demand exists for efficient, inexpensive and high contrast projector display devices for use in color display systems.

SUMMARY OF THE INVENTION

The invention provides in a first aspect a piezoelectric spatial light modulator including a substrate having an array of cavities and piezoelectric cantilevers arranged on the substrate. Each of the piezoelectric cantilevers includes a base portion on the substrate and a beam portion extending over a respective one of the cavities. Each of the piezoelectric cantilevers further includes a first electrode, a second electrode and a piezoelectric element between the electrodes. A flexible layer covers the cavities and the piezoelectric cantilevers. Reflective elements are each located on the flexible layer over a respective one of the beam portions.

The invention provides in a second aspect a piezoelectric spatial light modulator including a substrate having an array of cavities and piezoelectric cantilevers arranged on the substrate. Each of the piezoelectric cantilevers includes a base portion on the substrate and a beam portion extending over a respective one of the cavities. Each of the piezoelectric cantilevers further includes a first electrode, a second electrode, a piezoelectric element between the electrodes and a first transistor electrically connected to each of the piezoelectric cantilevers. Reflective elements are located over a respective one of the beam portions.

The above and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
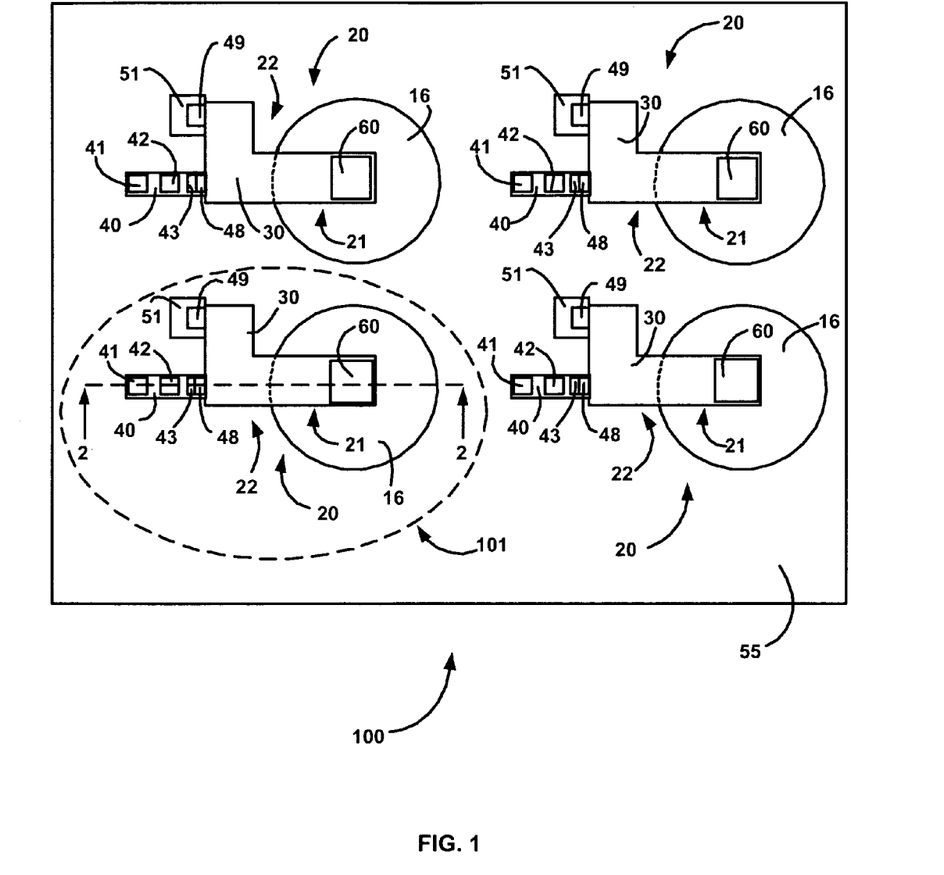
FIG. 1 is a top view of a piezoelectric cantilevered spatial light modulator in accordance with a first embodiment of the invention.
Figure 2:
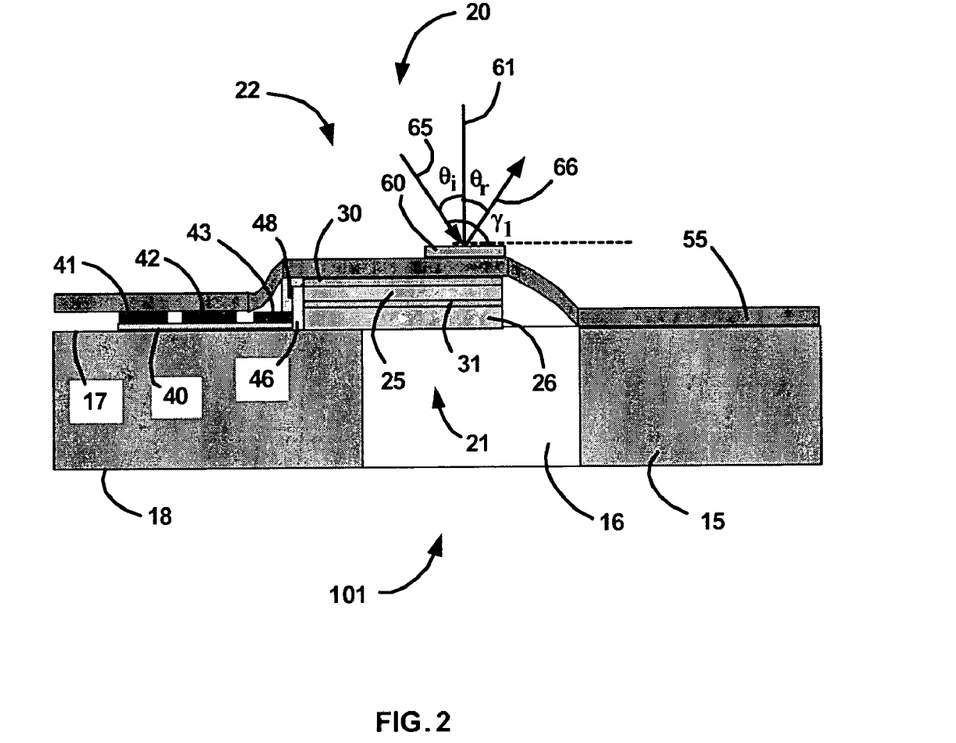
FIG. 2 is a cross-sectional view of the piezoelectrically-activated cantilever pixel in the OFF state in accordance with the first embodiment of the invention.

FIG. 1 is a top view of a piezoelectric cantilevered spatial light modulator 100 in accordance with a first embodiment of the invention. FIG. 2 is a cross-sectional view of a piezoelectrically-activated cantilever pixel 101 in the OFF state in accordance with the first embodiment of the invention. The plane upon which the cross-section view of FIG. 2 is taken is indicated by section line 2—2 in FIG. 1.

In this first embodiment, piezoelectric cantilevered spatial light modulator 100 is suitable for a matrix addressing scheme and is composed of a matrix of piezoelectrically-activated cantilever pixels 101. Piezoelectric cantilevered spatial light modulator 100 can be used in a display. The piezoelectric cantilevered spatial light modulator 100 is composed of substrate 15 (FIG. 2) having an array of cavities 16 and elongate piezoelectric cantilevers 20 mounted at a base portion 22 on the substrate 15. A beam portion 21 of each piezoelectric cantilever 20 extends over a cavity 16. The substrate 15 has a first surface 17 and an opposing second surface 18 (FIG. 2). The cavity 16 extends through the substrate 15 between the first surface 17 and the second surface 18. A flexible layer 55 covers the piezoelectric cantilevers 20, the first surface 17 of substrate 15, and the cavities 16. Reflective elements 60 are located on the flexible layer 55, so that each reflective element 60 is over the beam portion 21 of one of the piezoelectric cantilevers 20 extending over a respective cavity 16. In one embodiment, the reflective elements 60 are planar. In an alternative embodiment, the reflective elements 60 are concave.

In one embodiment, the cavities 16 are periodically spaced. In an alternative embodiment, the cavities 16 are periodically spaced in an array of rows and columns suitable for a matrix addressing scheme. The cavities 16 are positioned typically with a periodic spacing having a pitch in the range from about 80 µm to 750 µm. In one embodiment, the cavities 16 are positioned with a periodic spacing having a pitch of 100 µm.

Referring now to FIG. 2, reflective element 60 has a normal 61 and reflects optical beam 65 as optical beam 66 according to Snell's law so the angle of reflection $\theta_r$ equals the angle of incidence $\theta_i$. As shown in FIG. 2, the reflective element 60 is parallel to the major surface 17 of the substrate 15. The reflective element 60 is at an angle $\gamma_1$ with respect to optical beam 65. By parallelism, the first surface 17 is at an angle $\gamma_1$ with respect to optical beam 65.

The piezoelectric cantilever 20 incorporates a non-symmetric piezoelectric bimorph composed of a first electrode 30, a piezoelectric element 25, a second electrode 31, and a support layer 26 between the second electrode 31 and the substrate 15. The piezoelectric cantilever 20 is supported by the substrate 15 at the base portion 22. The piezoelectric element 25 is between the first electrode 30 and the second electrode 31, which apply an electric field to the material of the piezoelectric element 25.

The piezoelectric cantilevered spatial light modulator 100 includes transistors 40. Each of the transistors 40 is electrically connected to a respective one of the piezoelectric cantilevers 20. The transistor 40 has a source contact 41, a gate contact 42 and a drain contact 43. The source contact 41 is connected by a conductive trace line (not shown) to receive a reference voltage and the gate contact 42 is connected by a conductive trace line (not shown) to receive an activation signal.

The first electrode 30 is connected to the drain contact 43 of the transistor 40 via conductor 48. Electrical insulator 46 electrically insulates the drain contact 43 from the second electrode 31. The second electrode 31 is connected to a ground pad 51 via conductor 49 (FIG. 1).

The material of at least one of the first electrode 30 and the second electrode 31 includes gold, silver, platinum, palladium, copper, aluminum, and/or alloys thereof. In one embodiment, the first electrode 30 and the second electrode 31 include a layer of platinum and a layer of one of titanium and titanium oxide. The first electrode 30 and the second electrode 31 have a thickness in the range from about 100 nm to about 500 nm. In one embodiment, first electrode 30 and the second electrode 31 have a thickness of 200 nm.

The piezoelectric element 25 is composed of a layer of piezoelectric material having a thickness in the range from about 1 µm to about 10 µm thick. In one embodiment, the piezoelectric element 25 has a thickness of 1 µm. Examples of the piezoelectric material include, but are not limited to, lead zirconate titanate (PZT), lead lanthanum zirconate titanate (PLZT), lead magnesium niobate-lead zirconate titanate (PMN-PZT), lead zirconate niobate-lead zirconate titanate (PZN-PZT), aluminum nitride (AlN), and zinc oxide (ZnO). In one embodiment, the piezoelectric element 25 includes lead zirconate titanate (PZT) with a zirconate to titanate molar ratio of about 0.4 to about 0.6.

The material of the support layer 26 is a flexible material having a thickness in the range from about 1 µm to about 10 µm thick. In one embodiment, the support layer 26 has a thickness of 1 µm. Examples of the flexible material of the support layer 26 include, but are not limited to, silicon nitrides and silicon oxides.

The beam portion 21 has a width in the range from about 20 µm to about 80 µm. The base portion 22 has a width in the range of about one-and-a-half (1.5) to about four (4) times the width of the beam portion 21. The piezoelectric cantilever 20 has a total length, including the length of the base portion 22 and the length of the beam portion 21, in the range from about 75 µm to about 300 µm. The base portion 22 has a length in the range from about one fourth (¼) to about one half (½) of the total length of piezoelectric cantilever 20. In one embodiment, the base portion 22 has a length that is one-half (½) the length of the beam portion 21. In another embodiment, the total length of the piezoelectric cantilever 20 is 100 µm and the length of the beam portion 21 is 50 µm.

The cavity 16 has a diameter in the range from about 40 µm to about 600 µm. In one embodiment, the cavity is circular having a diameter of 100 µm, the piezoelectric cantilever 20 has a total length of 100 µm, the beam portion 21 has a length of 75 µm and a width of 50 µm, and the base portion has a width of 100 µm. The shape of the cavities 60 is shown herein as circular, but any other shape allowing free movement of the beam portion 21 of the piezoelectric cantilever 20 is possible, such as elliptical, rectangular, or square. When the cavity 16 is rectangular, the cavity 16 has a length in the range from about 40 µm to about 600 µm and a width in the range from about 40 µm to about 600 µm.

The material of the substrate 15 is typically glass. The substrate 15 has a thickness in the range from about 0.2 mm to about 2 mm. In one embodiment, the substrate 15 has a thickness of 0.5 mm. The glass substrate 15 of piezoelectric cantilevered spatial light modulator 100 is inexpensive relative to the semiconductor substrates of conventional MEMS display devices.

The flexible layer 55 protects the piezoelectric cantilevers 20 and cavities 60 from dust and/or harsh environments. The flexible layer 55 includes a flexible plastic having a thickness in the range from about 2 µm to about 10 µm. In another embodiment, the flexible layer is 5 µm thick. In one embodiment, the material of the flexible layer 55 is a polyimide. In one embodiment, the material of the flexible layer 55 is rubber.

The reflective element 60 includes a layer of a metallic material such as gold, silver, platinum, palladium, copper, aluminum, and/or alloys thereof. The reflective elements 60 are square or rectangular in a plane parallel to the first surface 17 of the substrate 15 and have a length in the range from about 20 µm to about 80 µm and a width in the range from about 20 µm to about 80 µm. In one embodiment, the reflective elements 60 are circular in the plane and have a diameter in the range from about 20 µm to about 80 µm. The reflective element 60 has a thickness in the range from about 200 nm to 2 µm. In one embodiment, the reflective element 60 has a thickness in the range from about 400 nm to about 700 nm.

The material of transistor 40 is a poly-silicon or amorphous silicon. In one embodiment, the transistor 40 has a 0.2 µm thick first layer doped n+ and a 0.2 µm thick second layer doped n−.

Figure 3:
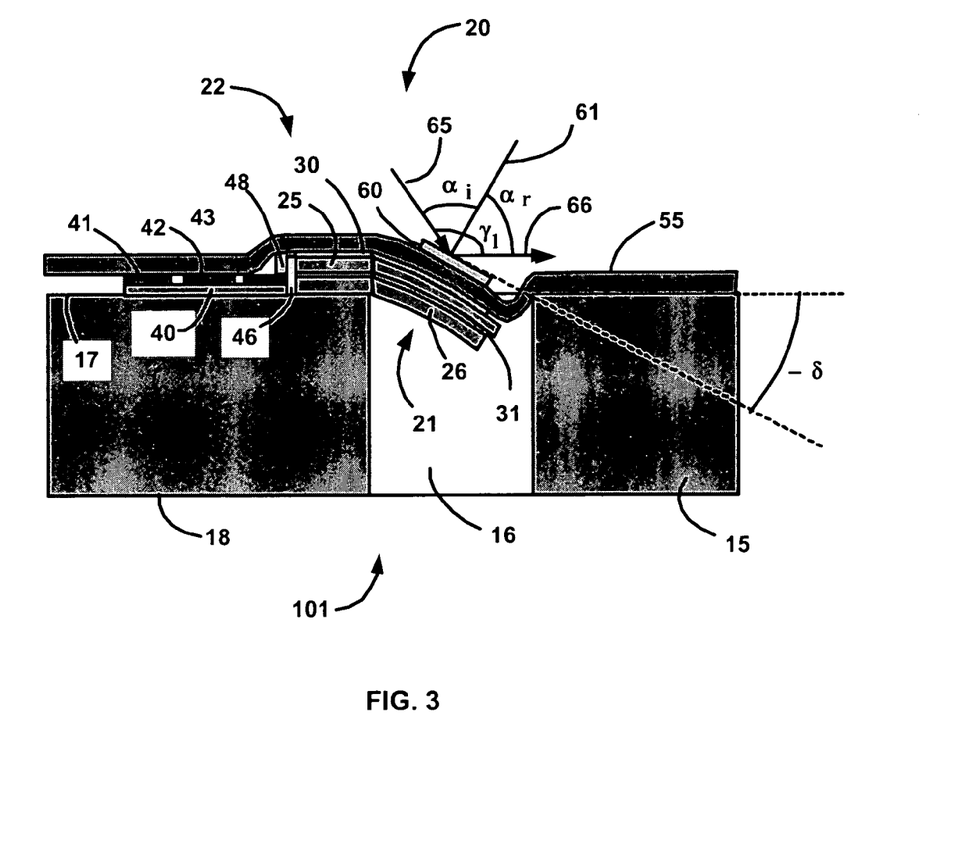
FIG. 3 is a cross-sectional view of the piezoelectrically-activated cantilever pixel in the ON state in accordance with the first embodiment of the invention.

FIG. 3 is a cross-sectional view of a piezoelectrically-activated cantilever pixel 101 of FIG. 2 in the ON state in accordance with the first embodiment of the invention. The electrodes 30 and 31, the electrically-connected piezoelectric element 25, and the support layer 26 form a non-symmetric piezoelectric bimorph.

Polarized piezoelectric material is a crystalline material that expands or contracts when subjected to an electric field. A poling process is used to polarize the piezoelectric material. During the poling process, the piezoelectric material is heated and a large uniform unidirectional electric field is applied to align the domain dipoles in the material. The large uniform unidirectional electric field is removed after the piezoelectric material is cooled. In an alternative embodiment, the piezoelectric material is cooled after the large uniform unidirectional electric field is removed. In one embodiment, the piezoelectric element 25 is poled by voltage applied to at least one of the electrodes 30–31.

When a voltage $V_1$ is applied to first electrode 30, and second electrode 31 is grounded, an electric field $E_1$ is established between the first electrode 30 and the second electrode 31 in the piezoelectric element 25. When the piezoelectric element 25 is poled in the same direction as the electric field $E_1$, the piezoelectric element 25 elongates under tensile stress while the flexible support layer 26 bends. The elongation of piezoelectric element 25 over the flexible support layer 26 causes the piezoelectric cantilever 20 to bend towards substrate 15 into the cavity 16. A voltage of 30 V to 300 V is applied to first electrode 30.

When the piezoelectric cantilever 20 bends, the flexible layer 55 overlying the beam portion 21 follows the motion the first electrode 30 of beam portion 21 and likewise bends. The reflective element 60 attached to the flexible layer 55 overlying the beam portion 21 of the piezoelectric cantilever 20 rotates relative to the first surface 17 of the substrate 15 as the piezoelectric cantilever 20 bends. As shown in FIG. 3, the first surface of reflective element 60 is at an angle $-\delta$ with respect to the first surface 17 of the substrate 15. Since the direction of incident optical beam 65 has not changed, incident optical beam 65 has an angle of incidence of $\alpha_i=(\theta_i+\delta)$ on reflective element 60 and reflected optical beam 66 has an equal angle of reflection $\alpha_r=(\theta_i+\delta)$, where $\theta_i$ was defined above with reference to FIG. 2. The voltage level applied to first electrode 30 controls the bending angle $-\delta$ and, hence, the direction in which reflected optical beam 66 is reflected.

Piezoelectrically-activated cantilever pixel 101 in the OFF state directs reflected optical beam 66 in a first reflected direction, as shown in FIG. 2. In that case, reflected optical beam 66 is not incident on a projection screen (not shown). The piezoelectrically-activated cantilever pixel 101 in the ON state directs reflected optical beam 66 in a second reflected direction, as shown in FIG. 3. Reflected optical beam 66 is further directed along an optical path in which reflected optical beam 66 is incident on a projection screen. The manner in which reflected optical beams 66 are reflected from the piezoelectric cantilevered spatial light modulator 100 and are directed towards or away from a projection screen is known in the art and is not presented in detail herein.

The relative positioning and spacing of the array of piezoelectrically-activated cantilever pixels 101 that form the piezoelectric cantilevered spatial light modulator 100 are determined by the type of projection display in which piezoelectric cantilevered spatial light modulator 100 is used. A typical resolution for a portable projector is the SVGA-standard with a display device having 800 pixels in a row and 600 pixels in a column. Higher resolution displays are provided by the XVGA standard with 1024 pixels in a row and 768 pixels in a column. Some high definition displays have a 16:9 ratio of pixels-in-a-row to pixels-in-a-column. An exemplary high definition display has 1280 pixels in each row and 720 pixels in each column.

Examples of methods of electronically addressing the pixels in the piezoelectric cantilevered spatial light modulator 100 include direct addressing, active matrix addressing, and passive matrix addressing. In direct addressing, each piezoelectrically-activated cantilever pixel 101 is indiviually addressable by a conductive trace line (not shown). The electronic circuitry for direct addressing in a display having 90 pixels in a row and 2 pixels per column requires 90×2 pads and 90×2 conductive trace lines.

When the electronic circuitry for direct addressing becomes too dense, as occurs for a display with a large number of pixels, the piezoelectrically-activated cantilever pixels 101 described herein can be more simply addressed via the transistors 40 in an active or passive matrix addressing scheme. In active or passive matrix addressing embodiments, piezoelectrically-activated cantilever pixels 101 share conductive trace lines (not shown), which are electrically connected to one of the source contact 41, the gate contact 42, and the ground pad 51. Typically, piezoelectrically-activated cantilever pixels 101 in a row share conductive row trace lines and the piezoelectrically-activated cantilever pixels 101 in a column share conductive column trace lines. The material of the conductive trace lines include a metallic material such as gold, silver, platinum, palladium, copper, aluminum, and/or alloys thereof. The conductive trace lines are located on the first surface 17 of substrate 15 and have a width in the range from about 0.5 µm to about 10 µm and a thickness in the range from about 100 nm to about 2 µm. In one embodiment, the conductive trace lines are aluminum and have a width of 5 µm and a thickness of 300 nm.

Active addressing requires a transistor 40 at each piezoelectrically-activated cantilever pixel 101 to store a charge. Passive matrix addressing relies on bistability for maintenance of the piezoelectrically-activated cantilever pixel 101 state. The bistablility of the piezoelectric material forming the piezoelectric element 25 determines which addressing scheme is preferred for the piezoelectric cantilevered spatial light modulator 100.

The optical characteristics of the piezoelectrically-activated cantilever pixel 101 of the piezoelectric cantilevered spatial light modulator 100 are binary: light from a light source (not shown) is reflected by the piezoelectrically-activated cantilever pixel 101 and either passes to the projection screen or does not pass to the projection screen. To produce a grey scale, the apparent brightness of each pixel is varied by temporally modulating the light that reaches the projection screen. The light is modulated by choosing a basic time period that will be called the illumination period of the piezoelectric cantilevered spatial light modulator 100. The piezoelectric cantilevered spatial light modulator 100 is illuminated through the illumination period, and each piezoelectrically-activated cantilever pixel 101 is set to its ON state for a first temporal portion of the illumination period, and to its OFF state for a second temporal portion. The second temporal portion constitutes the remainder of the illumination period, and is thus complementary to the first temporal portion. Alternatively, the OFF state may precede the ON state. The fraction of the illumination period constituted by the first temporal portion, during which the piezoelectric cantilevered spatial light modulator 100 is in its ON state, determines the apparent brightness of the piezoelectrically-activated cantilever pixel 101.

The principles just described may be extended to enable the piezoelectric cantilevered spatial light modulator 100 to generate a color image. In this case, the piezoelectric cantilevered spatial light modulator 100 is driven by the color components of a color video signal, and three illumination periods are defined for each frame of the color video signal, one for each color component. A light source illuminates piezoelectric cantilevered spatial light modulator 100 with light of a different color during each of the illumination periods. Each piezoelectrically-activated cantilever pixel 101 is set to its ON state for a fraction of each of the three illumination periods, and to its OFF state for the remainder of the illumination period. The fraction of each of the three illumination periods in which the piezoelectrically-activated cantilever pixel 101 is in its ON state determines the apparent saturation and hue of the piezoelectrically-activated cantilever pixel 101. The illumination periods of a color display may each correspond to one-third of the frame period of the color video signal, for example. Making the illumination period the same for the three color components is operationally convenient, but is not essential.

For each piezoelectrically-activated cantilever pixel 101 in the piezoelectric cantilevered spatial light modulator 100, an analog drive circuit according to the invention is formed by conventional semiconductor processing on and under the surface of the substrate 39. The analog drive circuit is composed of transistors, capacitors and other circuit elements (not shown) interconnected by one or more layers of conductors (not shown). The analog drive circuits driving the piezoelectrically-activated cantilever pixels 101 constituting the piezoelectric cantilevered spatial light modulator 100 are connected to one another and to pads through which external electrical connections are made by additional layers of conductors (not shown). The flexible layer 55 covers surface 17 of the substrate 15 and the above-mentioned layers of conductors.

In the piezoelectrically-activated cantilever pixel 101, the analog drive circuit (not shown) generates a drive signal that is applied to the piezoelectrically-activated cantilever pixel 101 via conductive trace lines. The drive signal applied to the electrode has a 1 state and a 0 state. The 1 state may be a high voltage state, and the 0 state may be a low voltage state, for example. The state of the drive signal applied to the piezoelectrically-activated cantilever pixel 101 determines whether or not the piezoelectric cantilever 20 bends toward substrate 15 into the cavity 16, as described above. The analog drive circuit sets the apparent brightness of the piezoelectrically-activated cantilever pixel 101 by applying the drive signal to the pixel electrode in response to an analog sample derived from a video signal. During each above-described illumination period, the drive signal starts in one state, corresponding to the ON state of the piezoelectrically-activated cantilever pixel 101, for example, and remains there for the first temporal portion. Before the end of the illumination period, the drive signal switches to the other state and remains there for the second temporal portion. The fraction of the illumination period for which the piezoelectrically-activated cantilever pixel 101 is in its ON state determines the apparent brightness of the piezoelectrically-activated cantilever pixel 101. When the video signal is a color video signal, the analog drive circuit sets the apparent saturation and hue of the piezoelectrically-activated cantilever pixel 101 by applying drive signals that turn the piezoelectrically-activated cantilever pixel 101 ON for fractions of three consecutive illumination periods that depend on the three color components of the color video signal.

The video signal may be a conventional analog video signal such as is generated by a conventional computer graphics adaptor card, video apparatus or television receiver. The video signal may be composed of digital graphics data such as is fed to a computer graphics adaptor or is generated by a digital video or television receiver.

U.S. Pat. No. 6,249,269 by Blalock et al. (the Blalock Patent) describes electronic circuits operable to drive pixels in a display array in response to an analog sample derived from a video signal. The electronic circuit drivers described in the Blalock Patent can be adapted for use with the piezoelectric cantilevered spatial light modulator 100 described herein.

The cavity 16 in piezoelectrically-activated cantilever pixel 101 and piezoelectrically-activated cantilever pixel 103 (FIGS. 5–7) is a through-hole cavity. The fabrication of the through-hole can be achieved in two separate stages. In the first stage, the substrate 15 is etched on the second surface 18 about half-way through the substrate 15 to form a bottom-surface-cavity. The second stage of fabrication of the through-hole occurs after completion of the fabrication steps to form the cantilever 20. In this case, the cantilever 20 is positioned so that the beam portion 21 of piezoelectric cantilever 20 is above the bottom-surface-cavity. Then, the first surface 17 is etched beneath the beam portion 21 of piezoelectric cantilever 20 to form a top-surface-cavity, which meets the bottom-surface-cavity, thereby forming the through-hole of cavity 16.

A process that can be used to form the top-surface-cavity for the through-hole cavity 16 is described in U.S. patent application Ser. No. 10/792,777 entitled "PIEZOELECTRIC CANTILEVER PRESSURE SENSOR," incorporated herein by reference. The shape of the cavity 16 can be circular, trapezoidal or other shapes, which allow free movement of the beam portion 21 of the piezoelectric cantilever 20. The top-surface-cavity and the bottom-surface-cavity can have about the same diameter or cross-length. In one embodiment, the bottom-surface-cavity is larger than the top-surface-cavity, but less than the periodic spacing of the top-surface-cavity.

Figure 4:
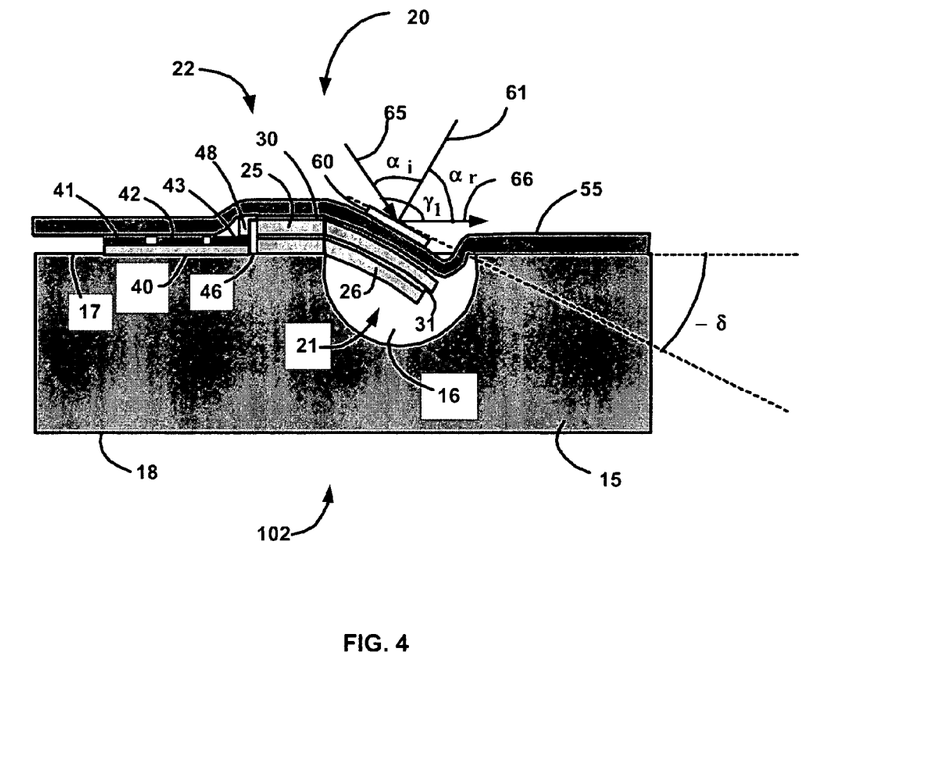
FIG. 4 is a cross-sectional view of piezoelectrically-activated cantilever pixel in the ON state in accordance with a second embodiment of the invention.

FIG. 4 is a cross-sectional view of piezoelectrically-activated cantilever pixel 102 in accordance with a second embodiment of the invention. The plane upon which the cross-section view of FIG. 4 is taken is indicated by section line 2—2 in FIG. 1.

As shown in FIG. 4, the substrate 15 has a first surface 17 on which the piezoelectric cantilever 20 of the piezoelectrically-activated cantilever pixel 102 is located and the cavity 16 extends partially into the substrate 15 from the first surface 17. In one embodiment, the depth of the cavity 16 is 20 µm to 60 µm at the deepest point from the first surface 17 of the substrate 15. In this embodiment, the cavity 16 is etched under the beam portion 21 of piezoelectric cantilever 20 after the piezoelectric cantilever 20 is formed. A process that can be used to form the cavity 16 is described in U.S. patent application Ser. No. 10/792,777 entitled "PIEZOELECTRIC CANTILEVER PRESSURE SENSOR," incorporated herein by reference.

Figure 5:
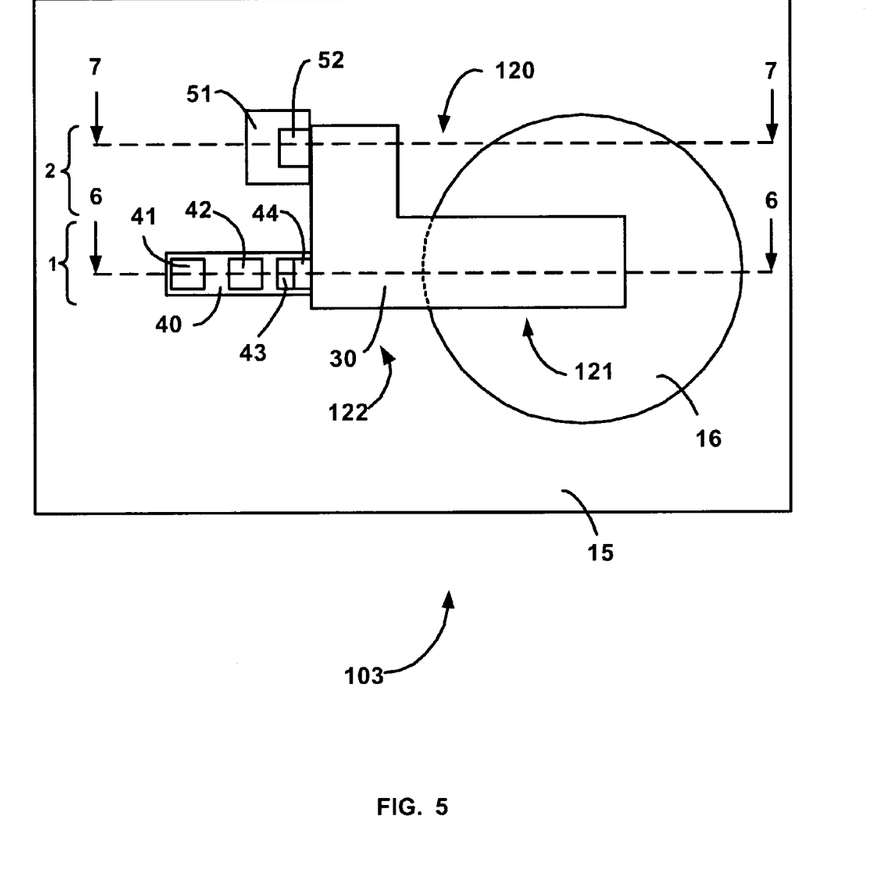
FIGS. 5–7 are views of a portion of a piezoelectrically-activated cantilever pixel according to a third embodiment of the invention.
Figure 6:
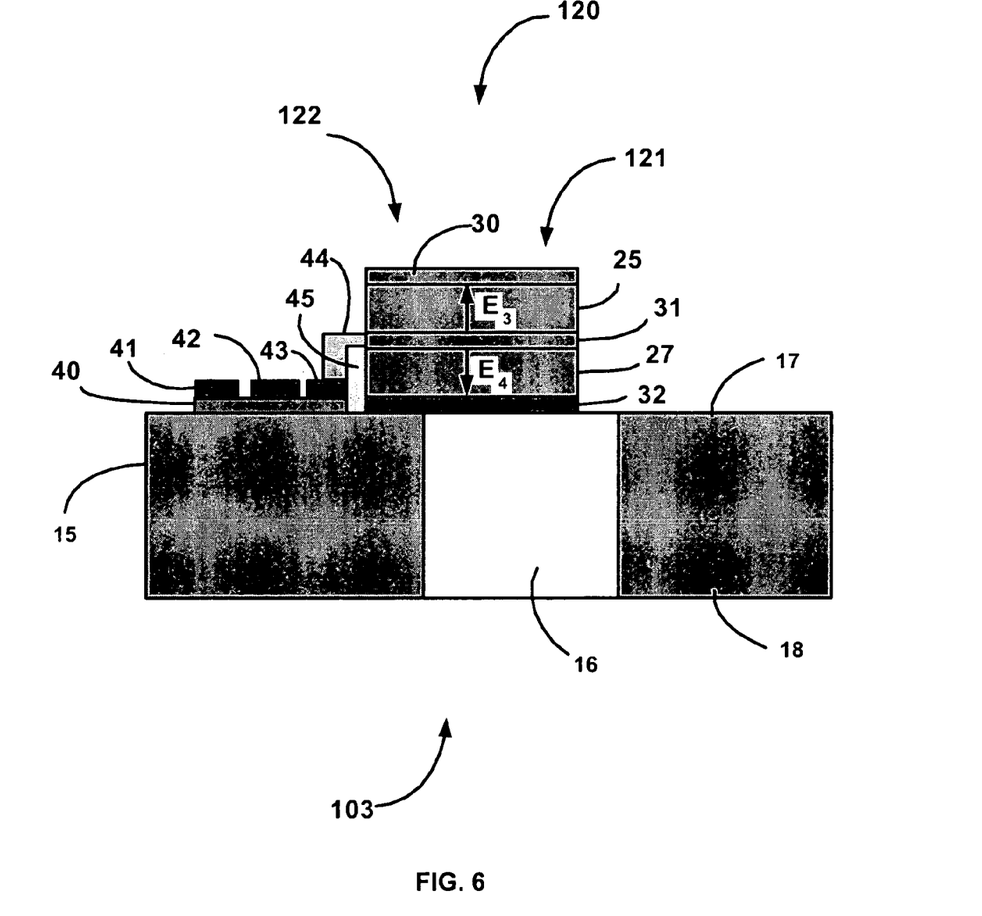
Figure 7:
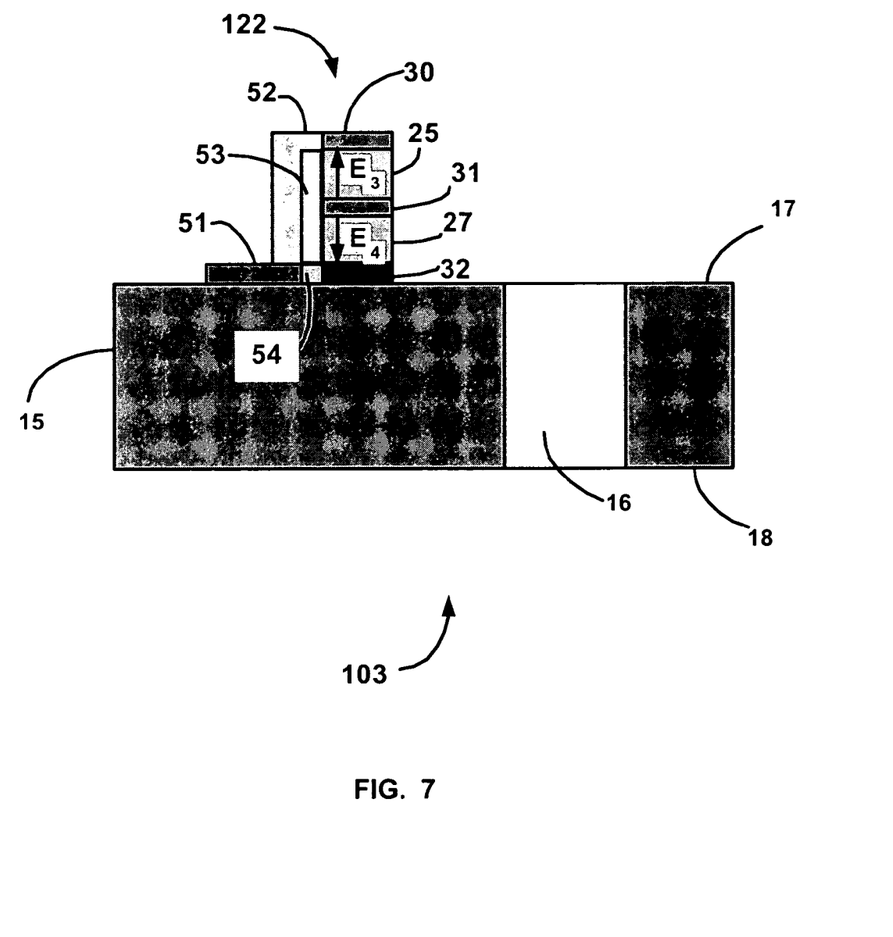

FIGS. 5–7 are views of a portion 103 of a piezoelectrically-activated cantilever pixel according to a third embodiment of the invention. FIGS. 5–7 illustrate an expanded view of the electrical connections between the transistor 40 and a piezoelectric cantilever 120. In this embodiment, the portion 103 of a piezoelectrically-activated cantilever pixel includes piezoelectric cantilever 120, a cavity 16 and a transistor 40. The piezoelectric cantilever 120 is a symmetrical bimorph structure and includes first piezoelectric element 25, a second piezoelectric element 27, first electrode 30, second electrode 31 and a third electrode 32. The second piezoelectric element 27 and third electrode 32 replace the support layer 26 of piezoelectric cantilever 20. The piezoelectric cantilever 120 can replace the piezoelectric cantilever 20 in FIG. 1 for use in a second embodiment of a piezoelectric cantilevered spatial light modulator.

The flexible layer 55 and the reflective element 60 of the alternative piezoelectrically-activated cantilever pixel are not shown in FIGS. 5–7 for clarity of illustration. The electrodes are configured to apply the voltage $V_3$ to the second electrode 31 while first electrode 30 and third electrode 32 are connected to ground pad 51. The plane upon which the cross-section view of FIG. 6 is taken is indicated by section line 6—6 in FIG. 5. The plane upon which the cross-section view of FIG. 7 is taken is indicated by section line 7—7 in FIG. 5.

FIG. 5 is a top view of the portion 103 of the alternative piezoelectrically-activated cantilever pixel according to the third embodiment of the invention. The piezoelectric cantilever 120 is L-shaped in the plane parallel to the first surface 17 of substrate 15 as has a long portion 1 and a short portion 2. The transistor 40 is adjacent to the long portion 1 of the piezoelectric cantilever 120 and is traversed by section line 6—6. A conductor 52 and a ground pad 51 are adjacent to the short portion 2 and are traversed by section line 7—7.

FIG. 6 is a cross-sectional view showing the electrical connection between the transistor 40 and the second electrode 31 of piezoelectric cantilever 120 according to the third embodiment of the invention. An electrical insulator 45 is located between the third electrode 32 and transistor 40. The electrical insulator 45 is also located between the second piezoelectric element 27 and transistor 40. The conductor 44 extends over the electrical insulator 45 from at least a portion of the drain contact 43 to electrically connect the second electrode 31 with the drain contact 43.

FIG. 7 is a cross-sectional view showing the electrical connection between the ground pad 51 and the first and third electrodes 30 and 32 of piezoelectric cantilever 120 of the according to the third embodiment of the invention. The third electrode 32 is in electrical communication with the ground pad 51 via conductor 54. An electrical insulator 53 covers the conductor 54 to electrically isolate the second electrode 31 from the third electrode 32 and from the ground pad 51. The conductor 52 covers the electrical insulator 53 and at least at least a portion of the ground pad 51 to electrically connect the first electrode 30 with the ground pad 51. The cavity 16 extends through the substrate 15 between the first surface 17 and the second surface 18 in a region away from the base portion 122 of the piezoelectric cantilever 120.

When a voltage $V_3$ is applied to the second electrode 31 in the third embodiment, an electric field $E_3$ is established between the first electrode 30 and the second electrode 31 in the first piezoelectric element 25 and an electric field $E_4$ is established between the third electrode 32 and the second electrode 31 in the second piezoelectric element 27. The electric field $E_3$ is opposite in direction from electric field $E_4$. A voltage of 30 V to 300 V is applied to the second electrode 31. In one embodiment, the electric field $E_3$ is equal in amplitude to and opposite in direction from electric field $E_4$.

When first piezoelectric element 25 and second piezoelectric element 27 are poled in a direction parallel to the electric field $E_3$, the application of voltage $V_3$ to second electrode 31 causes first piezoelectric element 25 to elongate under tensile stress and the second piezoelectric element 27 to contract under compressive stress. The combination of the elongation of piezoelectric element 25 and contraction of piezoelectric element 27 causes the piezoelectric cantilever 120 symmetrical bimorph structure to bend towards substrate 15 into the cavity 16.

In one embodiment, the piezoelectrically-activated cantilever pixel does not include a flexible layer 55, so that portion 103, as shown in FIGS. 5–7, and a plane reflective surface 60 together form a piezoelectrically-activated cantilever pixel. In this case, piezoelectrically-activated cantilever pixel is protectively packaged from dust and harsh environments, so that the piezoelectrically-activated cantilever pixel does not require the protection provided by the flexible layer 55.

Figure 8A:
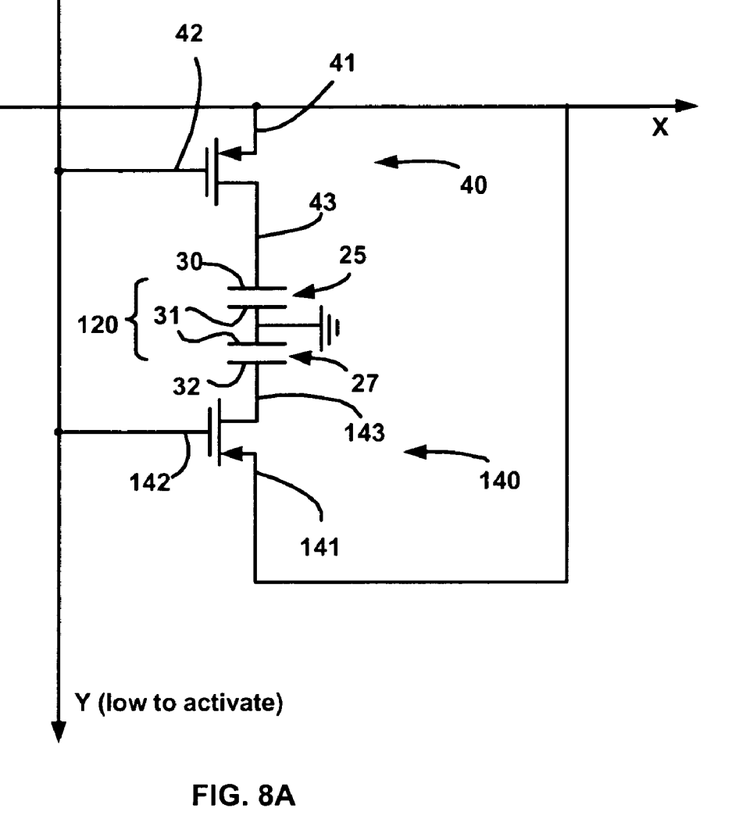
FIG. 8A is schematic drawing of an electronic circuit to activate a piezoelectrically-activated cantilever pixel according to a fourth embodiment of the invention.
Figure 8B:
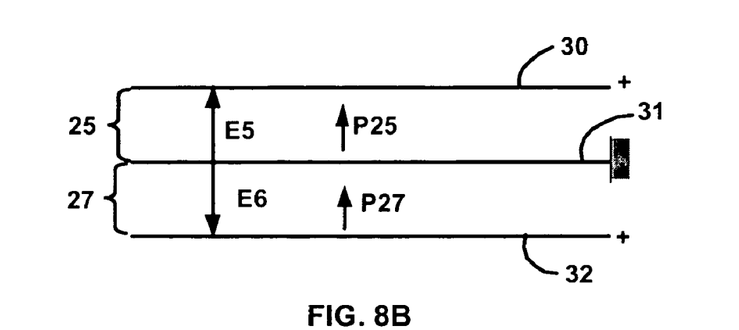
FIG. 8B is schematic drawing of the poling and electric fields in the activated piezoelectrically-activated cantilever pixel according to a fourth embodiment of the invention.

FIG. 8A is schematic drawing of an electronic circuit to activate a piezoelectrically-activated cantilever pixel according to a fourth embodiment of the invention. FIG. 8B is schematic drawing of the poling and electric fields in the activated piezoelectrically-activated cantilever pixel according to a fourth embodiment of the invention. The electrical insulators and conductors required to provide the electrical connections are similar to those described above with respect to FIGS. 2, 3, and 5–7. In this fourth embodiment, the piezoelectrically-activated cantilever pixel is driven by a first transistor 40 and a second transistor 140.

This electronic circuit can be used with the piezoelectric cantilever 120 described above with reference to FIGS. 5–7. The piezoelectrically-activated cantilever pixel includes a symmetrical bimorph structure that has a first piezoelectric element 25 and a second piezoelectric element 27. The first piezoelectric element 25 is represented as the capacitor between the first electrode 30 and the second electrode 31. The second piezoelectric element 27 is represented as the capacitor between the second electrode 31 and the third electrode 32.

The first transistor 40 has a source contact 41, a gate contact 42 and a drain contact 43. The second transistor 140 has a source contact 141, a gate contact 142 and a drain contact 143. The gate 42 of first transistor 40 and gate 142 of the second transistor 140 are connected to column line Y to receive an activation signal. The source 41 of first transistor 40 and source 141 of the second transistor 140 are connected to row line X to receive a reference voltage. The drain 43 of first transistor 40 is connected to first electrode 30. The drain 143 of second transistor 140 is connected to third electrode 32. The second electrode 31 is connected to a D.C. voltage, e.g., ground. The transistor 40 and transistor 140 are p-type metal-oxide-semiconductor (PMOS) transistors.

When piezoelectric cantilever 120 is activated, the voltage on column line Y is lower in than the voltage on row line X. The application of a positive voltage $V_4$ from row line X to first electrode 30 and third electrode 32 generates an electric field $E_5$ (FIG. 8B) in the first piezoelectric element 25 and an electric field $E_6$ (FIG. 8B) in the second piezoelectric element 27. The electric field $E_5$ generated in the first piezoelectric element 25 is directed from second electrode 31 towards first electrode 30 and the electric field $E_6$ generated in the second piezoelectric element 27 is directed from second electrode 31 towards third electrode 32. The poling direction of the first piezoelectric element 25 is indicated by arrow P25 in FIG. 8B. The poling direction of the second piezoelectric element 27 is indicated by arrow P27 in FIG. 8B. In this embodiment, the first piezoelectric element 25 and the second piezoelectric element 27 are poled in the same direction as the electric field $E_5$.

In the fourth embodiment, the application of a positive voltage $V_4$ to first electrode 30 and third electrode 32 causes first piezoelectric element 25 to elongate under tensile stress due to the same directions of the electric field $E_5$ relative to the poling P25. The application of a positive voltage $V_4$ to first electrode 30 and third electrode 32 causes the second piezoelectric element 27 to contract under compressive stress due to the opposite directions of the electric field $E_6$ relative to the poling P27. The combination of the elongation of piezoelectric element 25 and the contraction of piezoelectric element 26 causes the piezoelectric cantilever symmetrical bimorph structure, such as the piezoelectric cantilever 120 illustrated in FIGS. 5–7, to bend towards substrate 15 into the cavity 16.

In one embodiment, the piezoelectric element 25 and the second piezoelectric element 27 are of the same material and the thickness piezoelectric element 25 and the thickness of second piezoelectric element 27 are equal.

Figure 9A:
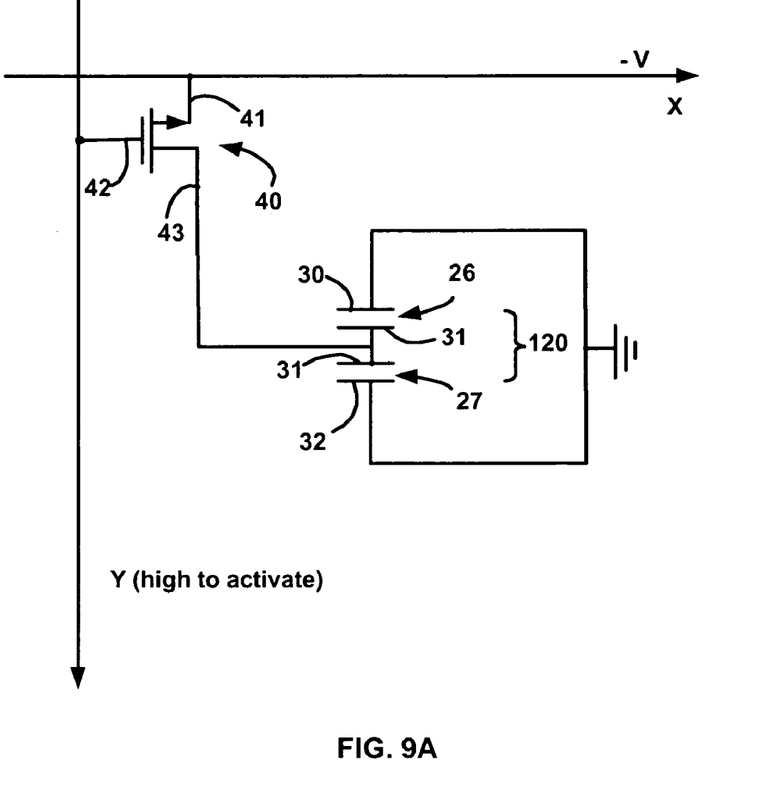
FIG. 9 is schematic drawing of the electronic circuit operable to activate a piezoelectrically-activated cantilever pixel according to a fifth embodiment of the invention.
Figure 9B:
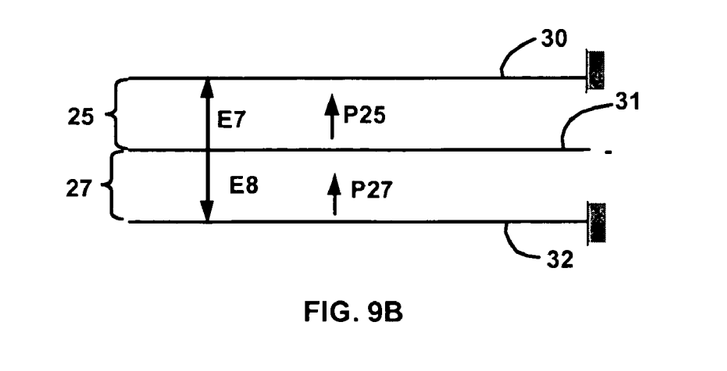

FIG. 9 is a schematic drawing of the electronic circuit operable to activate a piezoelectrically-activated cantilever pixel according to a fifth embodiment of the invention. FIG. 9B is schematic drawing of the poling and electric fields in the activated piezoelectrically-activated cantilever pixel according to a fourth embodiment of the invention. The electrical insulators and conductors required to provide the electrical connections are similar to those described above with respect to FIGS. 2, 3, and 5–7. In this fifth embodiment, the piezoelectrically-activated cantilever pixel is driven by transistor 40.

This electronic circuit can be used with the piezoelectric cantilever 120 described above with reference to FIGS. 5–7. The piezoelectrically-activated cantilever pixel includes a symmetrical bimorph structure including first piezoelectric element 25 and second piezoelectric element 27 as described above with respect to FIG. 8A.

The transistor 40 has a source contact 41, a gate contact 42 and a drain contact 43. The gate 42 of first transistor 40 is connected to column line Y to receive an activation signal. The source 41 of transistor 40 is connected to row line X to receive a reference voltage. The drain 43 of transistor 40 is connected to second electrode 31. The first electrode 31 and third electrode 32 connected to a D.C. voltage, e.g., ground. The transistor 40 is an n-type metal-oxide-semiconductor (NMOS) transistor.

When piezoelectric cantilever 120 is activated, the voltage on column line Y is higher in than the voltage on row line X. The application of a negative voltage $V_5$ from row line X to second electrode 31 generates an electric field $E_7$ in the first piezoelectric element 25 and an electric field $E_8$ in the second piezoelectric element 27. The source 41 is more negative than the drain 43, in this embodiment. The electric field $E_7$ generated in the first piezoelectric element 25 is directed from second electrode 31 towards first electrode 30 and the electric field $E_6$ generated in the second piezoelectric element 27 is directed from second electrode 31 towards third electrode 32. In FIG. 9B, arrows P25 and P27 indicated the poling direction of the first piezoelectric element 25 and second piezoelectric element 27, respectively. In this embodiment, the first piezoelectric element 25 and the second piezoelectric element 27 are poled in the same direction as the electric field $E_7$.

The application of a negative voltage $V_5$ to second electrode 31 causes first piezoelectric element 25 to elongate under tensile stress due to the same directions of the electric field $E_7$ relative to the poling P25. The application of a negative voltage $V_5$ to second electrode 31 causes the second piezoelectric element 27 to contract under compressive stress due to the opposite directions of the electric field $E_8$ relative to the poling P27. The combination of the elongation of piezoelectric element 25 and the contraction of piezoelectric element 26 causes the piezoelectric cantilever symmetrical bimorph structure, such as the piezoelectric cantilever 120 illustrated in FIGS. 5–7, to bend towards substrate 15 into the cavity 16.

In one embodiment, the piezoelectric element 25 and the second piezoelectric element 27 are of the same material and the thickness piezoelectric element 25 and the thickness of second piezoelectric element 27 are equal.

In one embodiment, the transistor 40 is a p-type metal-oxide-semiconductor (PMOS) transistor, the poling directions P25 and P27 are reversed and the application of a positive voltage $V_5$ to second electrode 31 causes first piezoelectric element 25 to elongate under tensile stress and the second piezoelectric element 27 to contract under compressive stress due to the opposite directions of the electric fields $E_7$ and $E_8$ relative to the poling P25 and P27. The combination of the elongation of piezoelectric element 25 and the contraction of piezoelectric element 26 causes the piezoelectric cantilever symmetrical bimorph structure, such as the piezoelectric cantilever 120 illustrated in FIGS. 5–7, to bend towards substrate 15 into the cavity 16.

In another embodiment, the transistor 40 is a p-type metal-oxide-semiconductor (PMOS) transistor, the poling directions P25 and P27 are the same as in FIG. 9B and the application of a positive voltage $V_5$ to second electrode 31 causes first piezoelectric element 25 to contract under compressive stress and the second piezoelectric element 27 to elongate under tensile stress. The combination of the contraction of piezoelectric element 25 and the elongation of piezoelectric element 26 causes the piezoelectric cantilever symmetrical bimorph structure, such as the piezoelectric cantilever 120 illustrated in FIGS. 5–7, to bend away from the substrate 15.

The fabrication of the embodiments of the present invention include several steps that are common to the process for fabricating the piezoelectric cantilever pressure sensor described in the above-mentioned U.S. patent application Ser. No. 10/792,777, entitled "PIEZOELECTRIC CANTILEVER PRESSURE SENSOR."

For the first embodiment of this invention, the process for fabricating the piezoelectric cantilever 20, the cavities 16 and the electrically addressing conductive trace lines, such as Y, X, in FIGS. 8 and 9, in electrical connection with the transistor 40 for the piezoelectric cantilevered spatial light modulator 100 are the same as the process for fabricating the piezoelectric cantilever pressure sensor described in the previously referenced U.S. patent application Ser. No. 10/792,777. Those processes are not repeated herein. Identical or similar process steps can be used to fabricate piezoelectric cantilever 120, piezoelectric cantilever 20 and the cavities 16 of the piezoelectric cantilevered spatial light modulator 100.

The same method of forming the protective layers as described in the U.S. patent application Ser. No. 10/792,777 can be used to form the flexible layer 55 in the piezoelectric cantilevered spatial light modulator 100.

In an alternative fabrication process, the flexible layer 55 is attached to the piezoelectric cantilevers 20 and the substrate 15 by placing a sheet of flexible material over the substrate 15, transistors 40, cavities 16, and piezoelectric cantilevers 20 of piezoelectrically-activated cantilever pixel 101. In this process, an adhesive layer is applied to a second surface of the sheet of flexible material prior to placement of the second surface of the sheet of flexible material on substrate 15, transistors 40 and piezoelectric cantilevers 20. The adhesive layer securely attaches the flexible layer 55 to the piezoelectric cantilevers 20 and the substrate 15. This method of placing a flexible material over the substrate 15 and piezoelectric cantilevers 20 can provide a low cost process in the fabrication of the piezoelectric cantilevered spatial light modulator 100.

In an alternative fabrication process, the flexible layer 55 is attached to the piezoelectric cantilevers 20 and the substrate 15 by placing a sheet of flexible material over the substrate 15, transistors 40, cavities 16, and piezoelectric cantilevers 20 of piezoelectrically-activated cantilever pixel 101 and omitting the adhesive described above. In this embodiment, the electrostatic forces between the flexible layer 50 and the piezoelectrically-activated cantilever pixel 101 are large enough to hold the flexible layer 55 to the piezoelectrically-activated cantilever pixel 101 as it bends downward. This alternative method of placing a flexible material over the piezoelectric cantilevers 20 and substrate 15 provides a low cost process in the fabrication of the piezoelectric cantilevered spatial light modulator 100.

The reflective elements 60 are formed by sputtering a metallic material such as gold, silver, platinum, palladium, copper, aluminum, and/or alloys thereof over the deposited flexible layer 55, and selectively etching the sputtered layer to form the reflected surfaces 60 over the beam portion 21 of the piezoelectric cantilevers 20.

This disclosure describes the invention in detail using illustrative embodiments. However, the invention defined by the appended claims is not limited to the precise embodiments described.

The invention claimed is:

1. A piezoelectric spatial light modulator, comprising:
a substrate having an array of cavities; and
piezoelectric cantilevers arranged on the substrate, each of the piezoelectric cantilevers comprising a base portion on the substrate and a beam portion extending over a respective one of the cavities, each of the piezoelectric cantilevers further comprising a first electrode, a second electrode and a piezoelectric element between the electrodes;
a flexible layer covering the cavities and the piezoelectric cantilevers; and
reflective elements, each located on the flexible layer over a respective one of the beam portions.

2. The piezoelectric spatial light modulator of claim 1, additionally comprising a transistor electrically connected to one of the electrodes of each one of the piezoelectric cantilevers.

3. The piezoelectric spatial light modulator of claim 1, in which:
the piezoelectric element is a first piezoelectric element; and
each of the piezoelectric cantilevers additionally comprises a third electrode and a second piezoelectric element between the second electrode and the third electrode.

4. The piezoelectric spatial light modulator of claim 3, additionally comprising a transistor electrically connected to one of the electrodes of each one of the piezoelectric cantilevers.

5. The piezoelectric spatial light modulator of claim 4, in which the transistor is one of a PMOS and an NMOS metal-oxide-semiconductor transistor and each comprises a source contact, a gate contact and a drain contact, the source contact connected to receive a reference voltage, the gate contact connected to receive an activation signal, and the drain contact connected to the second electrode.

6. The piezoelectric spatial light modulator of claim 3, additionally comprising a first transistor electrically connected to one of the electrodes of the first piezoelectric element in each of the piezoelectric cantilevers and a second transistor electrically connected to one of the electrodes of the second piezoelectric element in each of the piezoelectric cantilevers.

7. The piezoelectric spatial light modulator of claim 6, in which the first transistor and the second transistor are each one of a PMOS and an NMOS metal-oxide-semiconductor transistor and each comprises a source contact, a gate contact and a drain contact, the source contacts connected to receive a common reference voltage, the gate contacts connected to receive an activation signal, the drain contact of the first transistor connected to the first electrode, and the drain contact of the second transistor connected to the third electrode.

8. The piezoelectric spatial light modulator of claim 3, in which the first electrode, the second electrode and the third electrode comprise one of gold, silver, platinum, palladium, copper, aluminum, and alloys thereof.

9. The piezoelectric spatial light modulator of claim 1, in which the piezoelectric cantilever additionally comprises a support layer between the second electrode and the substrate.

10. The piezoelectric spatial light modulator of claim 9, in which the support layer comprises one of silicon nitride and silicon oxide.

11. The piezoelectric spatial light modulator of claim 1, in which the substrate comprises glass.

12. The piezoelectric spatial light modulator of claim 1, in which the piezoelectric element comprises one of lead zirconate titanate, lead lanthanum zirconate titanate, lead magnesium niobate-lead zirconate titanate, lead zirconate niobate-lead zirconate titanate, aluminum nitride, and zinc oxide.

13. The piezoelectric spatial light modulator of claim 1, in which the piezoelectric element comprises lead zirconate titanate with a zirconate to titanate molar ratio of about 0.4 to about 0.6.

14. The piezoelectric spatial light modulator of claim 1, in which the first electrode and the second electrode each comprise a layer of platinum and a layer of one of titanium and titanium oxide.

15. The piezoelectric spatial light modulator of claim 1, in which the flexible layer comprises polyimide.

16. The piezoelectric spatial light modulator of claim 1, in which the array of cavities is periodic.

17. The piezoelectric spatial light modulator of claim 1, in which the substrate has a first surface and a second surface opposite thereto, and the cavities extend through the substrate between the first surface and the second surface.

18. The piezoelectric spatial light modulator of claim 1, in which the substrate has a first surface and the cavities extend into the substrate from the first surface.

19. The piezoelectric spatial light modulator of claim 1, in which shape of the reflective elements is one of planar and concave.

20. A piezoelectric spatial light modulator, comprising:
a substrate having an array of cavities; and
piezoelectric cantilevers arranged on the substrate, each of the piezoelectric cantilevers comprising a base portion on the substrate and a beam portion extending over a respective one of the cavities, each of the piezoelectric cantilevers further comprising a first electrode, a second electrode and a piezoelectric element between the electrodes;
a first transistor electrically connected to one of the electrodes of each of the piezoelectric cantilevers; and
reflective elements, each located over a respective one of the beam portions.

21. The piezoelectric spatial light modulator of claim 20, in which:
the piezoelectric element is a first piezoelectric element; and
each of the piezoelectric cantilevers additionally comprises a third electrode and a second piezoelectric element between the second electrode and the third electrode; and
additionally comprising a second transistor electrically connected to another of the electrodes of each of the piezoelectric cantilevers, wherein the first transistor is electrically connected to one of the electrodes of the first piezoelectric element in each of the piezoelectric cantilevers and the second transistor is electrically connected to another of the electrodes of the second piezoelectric element in each of the piezoelectric cantilevers.

* * * * *